(12) United States Patent
Huang

(10) Patent No.: US 9,295,113 B2
(45) Date of Patent: Mar. 22, 2016

(54) POWER SYSTEM FOR AN LED MODULE INCLUDING MULTIPLE LEDS

(71) Applicant: Michelle Kun Huang, San Antonio, TX (US)

(72) Inventor: Michelle Kun Huang, San Antonio, TX (US)

(73) Assignee: General LED, Inc., San Antonio, TX (US)

( * ) Notice: Subject to any disclaimer, the term of this patent is extended or adjusted under 35 U.S.C. 154(b) by 0 days.

(21) Appl. No.: 14/225,899

(22) Filed: Mar. 26, 2014

(65) Prior Publication Data

US 2014/0292211 A1    Oct. 2, 2014

Related U.S. Application Data

(60) Provisional application No. 61/805,327, filed on Mar. 26, 2013.

(51) Int. Cl.
| H05B 33/08 | (2006.01) |
|---|---|
| F21S 4/00 | (2006.01) |
| F21V 23/06 | (2006.01) |

(52) U.S. Cl.
CPC .............. *H05B 33/0806* (2013.01); *F21S 4/001* (2013.01); *F21S 4/008* (2013.01); *F21V 23/06* (2013.01); *H05B 33/0878* (2013.01)

(58) Field of Classification Search
CPC . F21S 4/008; H05B 33/0878; H05B 33/0881; H05B 37/036
USPC .................................................. 315/160, 161
See application file for complete search history.

(56) References Cited

U.S. PATENT DOCUMENTS

| 7,331,688 B2* | 2/2008 | Peng | H01Q 13/08 315/185 R |
|---|---|---|---|
| 8,123,375 B2* | 2/2012 | Negley | G02F 1/133603 362/231 |
| 8,344,664 B2* | 1/2013 | Kim | H05B 33/0815 315/200 R |
| 8,382,316 B2* | 2/2013 | Osawa | F21V 23/00 362/217.1 |
| 8,410,680 B2* | 4/2013 | Medendorp, Jr. | C09K 11/586 313/501 |
| 8,783,901 B2* | 7/2014 | Zoorob | F21K 9/00 257/103 |
| 8,858,032 B2* | 10/2014 | Van De Ven | F21K 9/00 362/249.01 |
| 2009/0184616 A1* | 7/2009 | Van De Ven | H05B 33/086 313/1 |
| 2011/0007104 A1* | 1/2011 | Nakazawa | G09G 3/3413 345/690 |
| 2011/0291574 A1* | 12/2011 | Ji | H05B 33/0815 315/187 |
| 2012/0286678 A1* | 11/2012 | Wu | H05B 33/0815 315/188 |
| 2013/0083524 A1* | 4/2013 | Devorris | F21V 31/04 362/235 |
| 2014/0132163 A1* | 5/2014 | Baumann | H05B 33/083 315/185 R |

FOREIGN PATENT DOCUMENTS

EP    1932672 A2 *    6/2008    ................ B41J 2/21

* cited by examiner

*Primary Examiner* — Jason M Crawford
*Assistant Examiner* — Kurtis R Bahr
(74) *Attorney, Agent, or Firm* — Alan R. Thiele; William H. Quirk; Rosenthal Pauerstein Sandoloski Agather LLP

(57) ABSTRACT

A power system for a group of LED modules each of which includes a plurality of LEDs or series-connected LEDs, utilizes a plurality of polarized direct current power supplies with one electrical polarity separated, and the other electrical polarity commonly connected. Each individual LED, or each set of series-connected individual LEDs, in each of the LED modules, are connected in series to each of the direct power supplies and then to an opposite polarity to complete an electrical circuit.

19 Claims, 17 Drawing Sheets

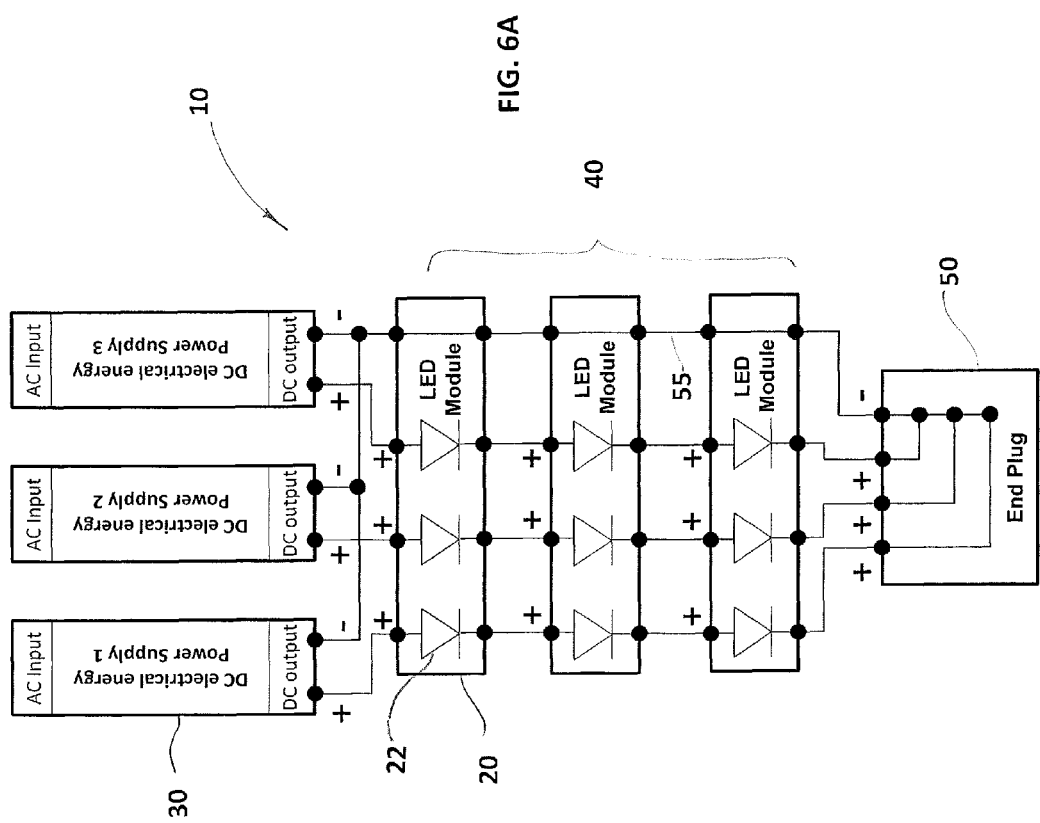

POWER SYSTEM FOR AN LED MODULE INCLUDING MULTIPLE LEDS

CROSS REFERENCE TO RELATED APPLICATION

This application claims the benefit of Provisional U.S. Patent Application Ser. No. 61/805,327, filed on Mar. 26, 2013, the entire disclosure of which is hereby incorporated by reference into the present disclosure.

STATEMENT REGARDING FEDERALLY FUNDED RESEARCH AND DEVELOPMENT

The system described in this patent application was not the subject of federally sponsored research or development.

FIELD

The present system pertains to connecting multiple direct current electrical energy power supplies in proper form to LED modules which LED modules contain one or more individual LEDs or one or more sets of series-connected individual LEDs.

BACKGROUND

The development of LEDs as a light source for use in many applications has grown rapidly over the past several years. Accordingly, LEDs are now being used in applications where higher wattage incandescent lamps, fluorescent lamps or halogen lamps were previously used. As in any electrical application of electrical energy to lighting devices, there is a continuing demand to reduce costs by minimizing the number of energy consuming units in a multi-unit system and to reduce costs by increasing the efficiency of an electrical system by reducing the amount of electrical energy consumed.

SUMMARY

The efficiency of an LED lighting system including LED modules having multiple LEDs contained therein is increased by use of the disclosed power system.

The power system for an LED module including multiple individual LEDs of the disclosed system includes a plurality of direct current (DC) electrical energy power supplies. The number of direct current (DC) electrical energy output channels from the plurality of direct current (DC) electrical energy power supplies is equal to the number of individual LEDs in each LED module. Each one of the direct current (DC) electrical energy output channels is directly connected to one of the individual LEDs in an LED module. For example, a first electrically positive polarity output of each of said direct current (DC) electrical energy output channels is connected to the positive side of an individual LED. The negative polarity of the direct current electrical energy power supply is connected to the negative side of each individual LED to complete the electrical circuit. Alternatively, the first polarity may be electrically negative. In such case, completing the circuit will require connection to an electrically positive polarity.

The power system for a plurality of LED modules of the disclosed system wherein each LED module includes the same number of LEDs includes a plurality of direct current (DC) electrical energy power supplies wherein the number of direct current (DC) electrical energy output channels is equal to the number of individual LEDs or sets of series-connected individual LEDs in each LED module. Each of the individual LEDs or sets of series-connected individual LEDs in an LED module being directly electrically connected to an individual LED or a set of series-connected individual LEDs in the next LED module. Accordingly, the number of series connections across all LED modules is equal to the number of individual LEDs or sets of series-connected individual LEDs in each LED module. Each of the direct current (DC) electrical energy channels is directly electrically connected to one of the series connections across all LED modules. The first electrical polarity output of the direct current (DC) electrical energy output channel is connected to the same polarity of the first individual LEDs. The output polarity of the last individual LED or set of series-connected individual LEDs in the series connection is connected to an electrically opposite polarity of the output of the direct current (DC) electrical energy channel to complete the electrical circuit to the direct current (DC) electrical energy power supply.

BRIEF DESCRIPTION OF THE DRAWING FIGURES

A still better understanding of the disclosed power system for an LED module including multiple LEDs may be had by reference to the drawings which provide a graphic description to supplement the following Description of the Embodiments, wherein.

Figure 4:
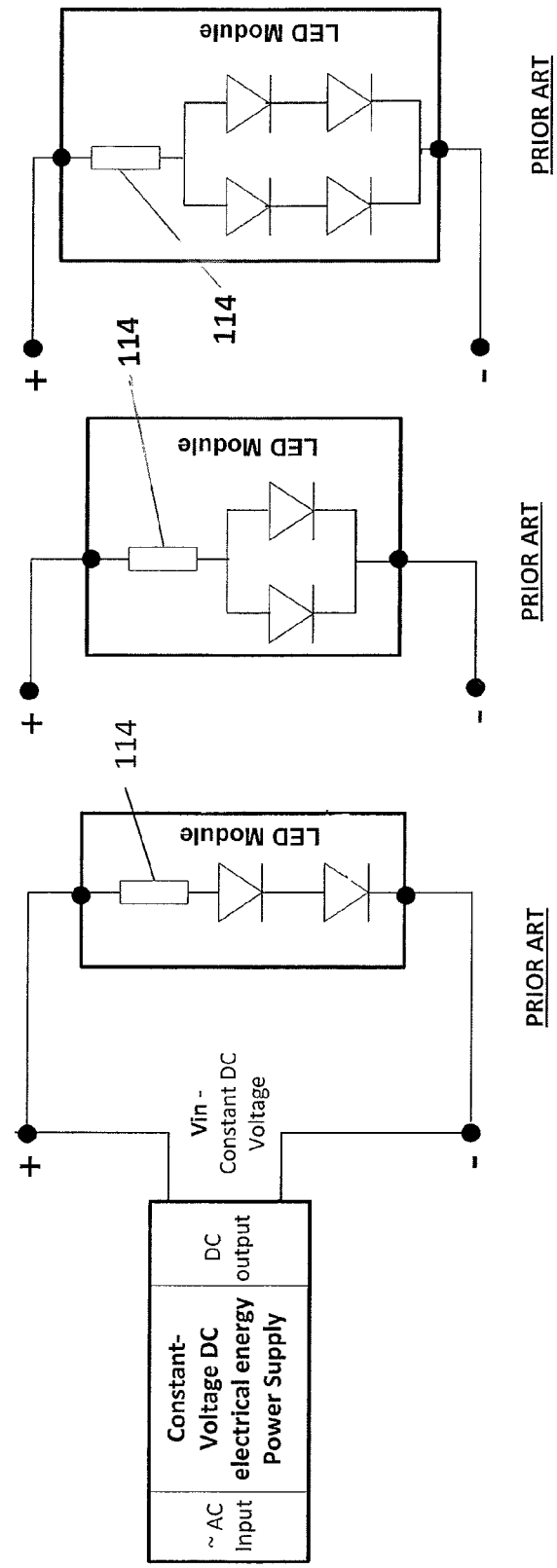

FIGS. 4A, 4B, and 4C are schematic diagrams of prior art LED systems showing the connection of a constant voltage direct current (DC) power supply connected to an LED module having individual LEDs connected in series, or individual LEDs connected in parallel, or two sets of two individual LEDs connected in series, connected in parallel.

Figure 5:
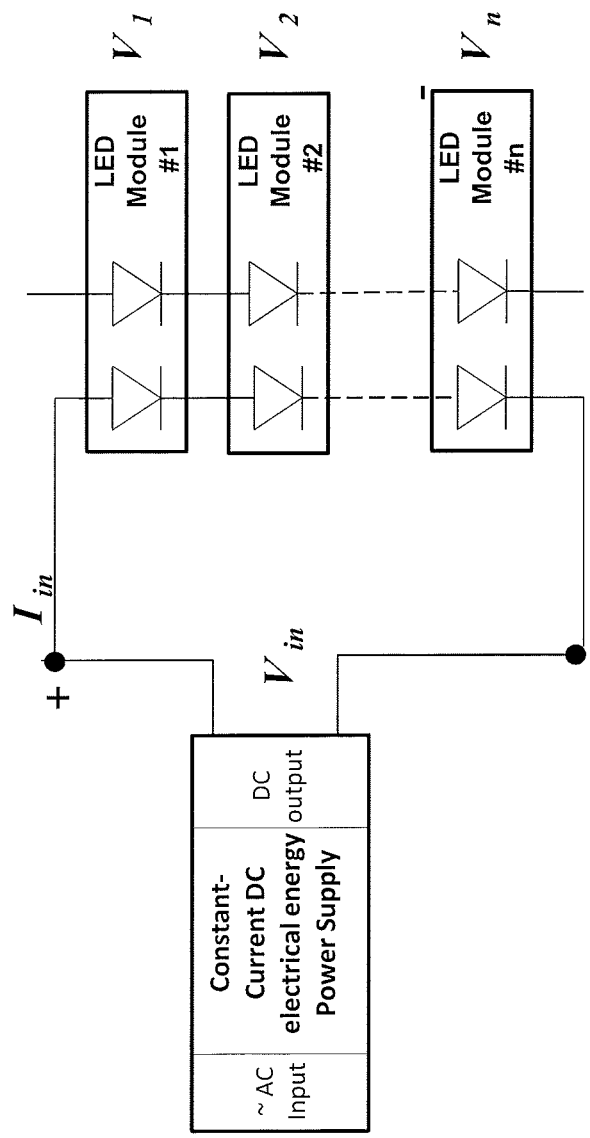
Figure 6B:
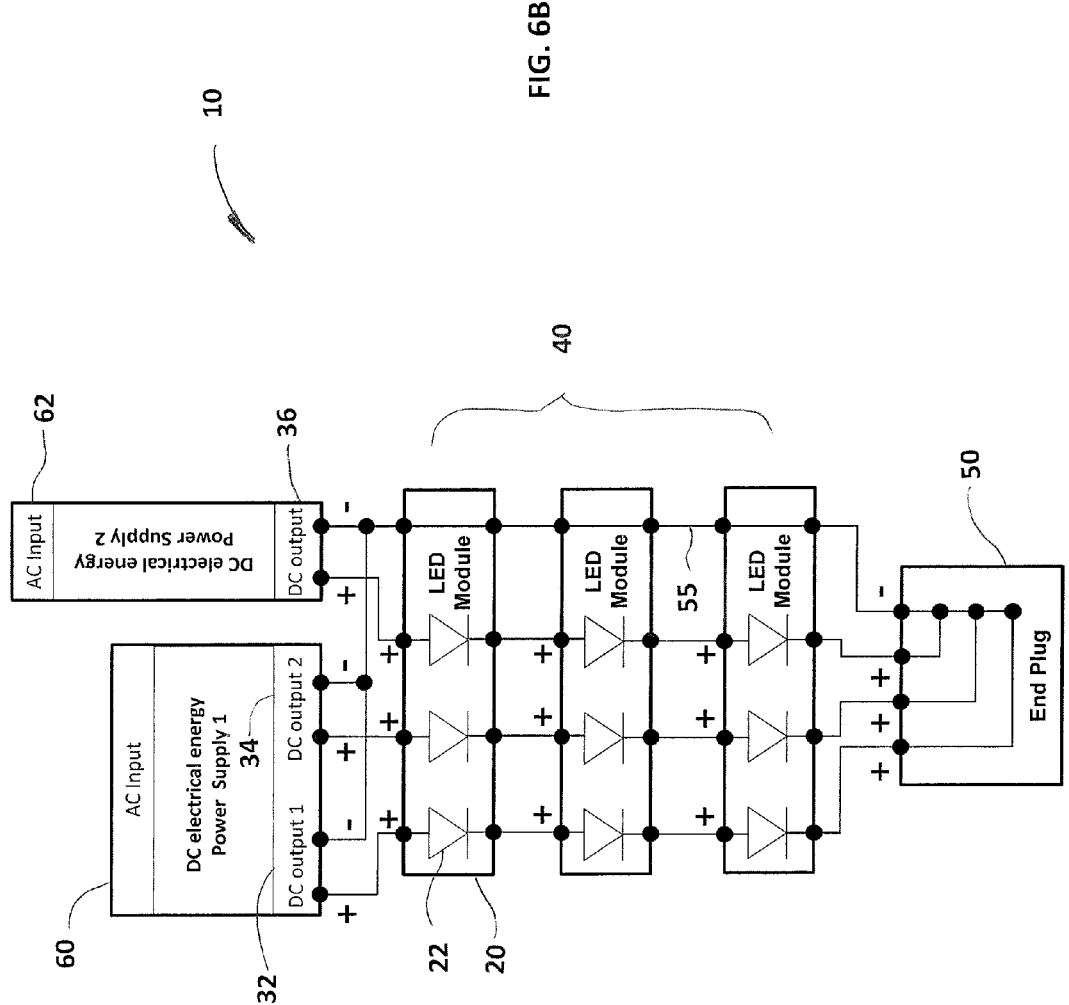
Figure 6C:
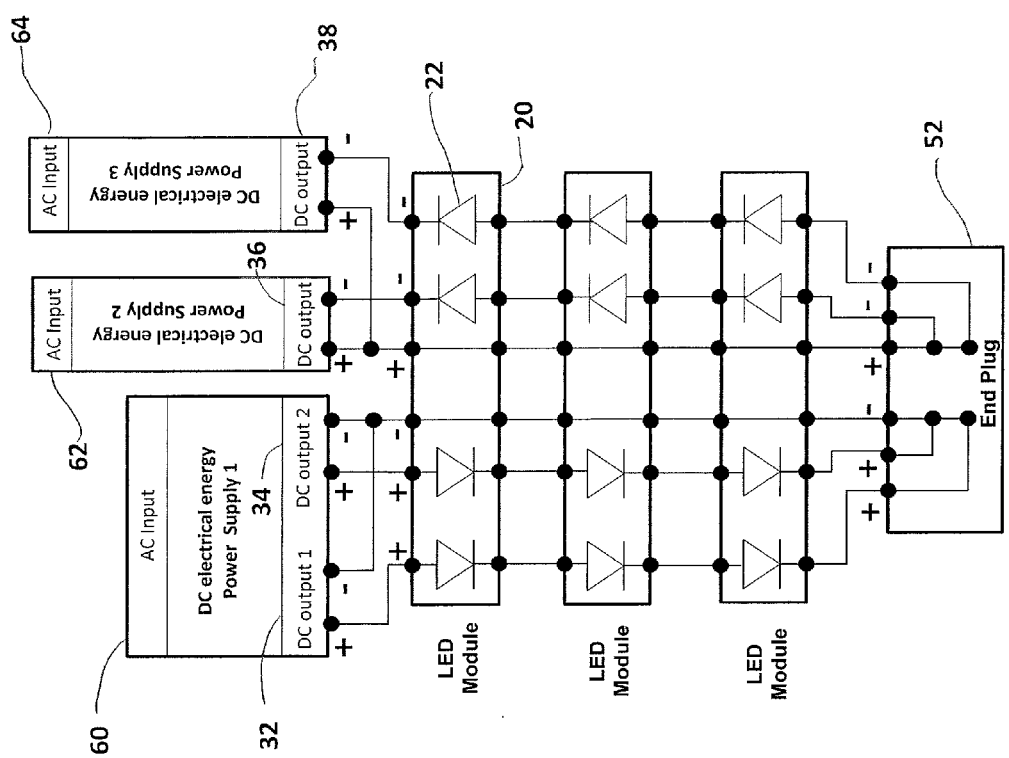
Figure 7:
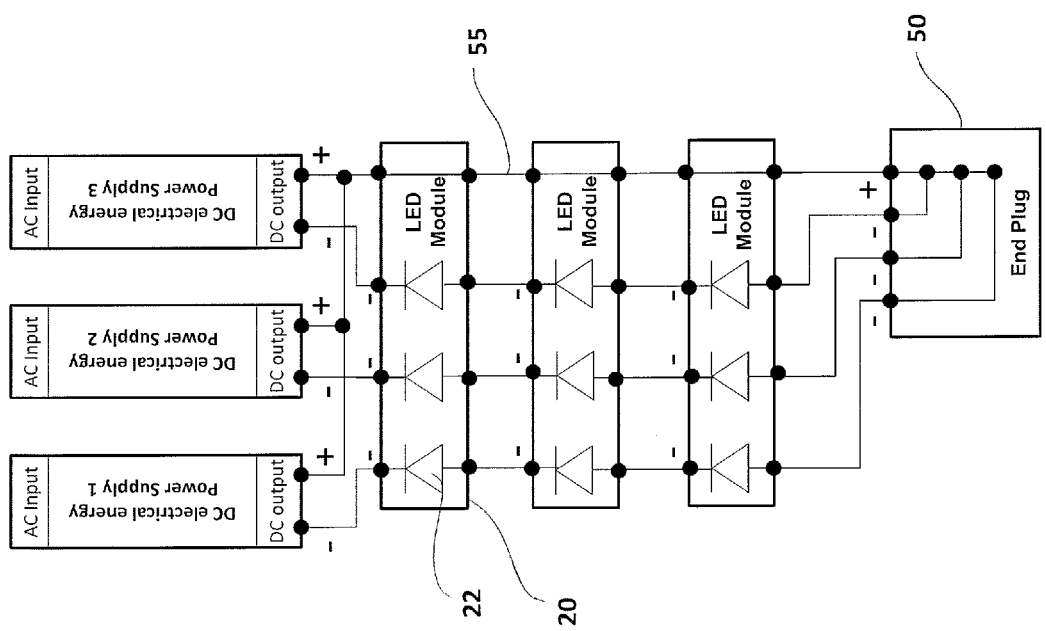
Figure 8:
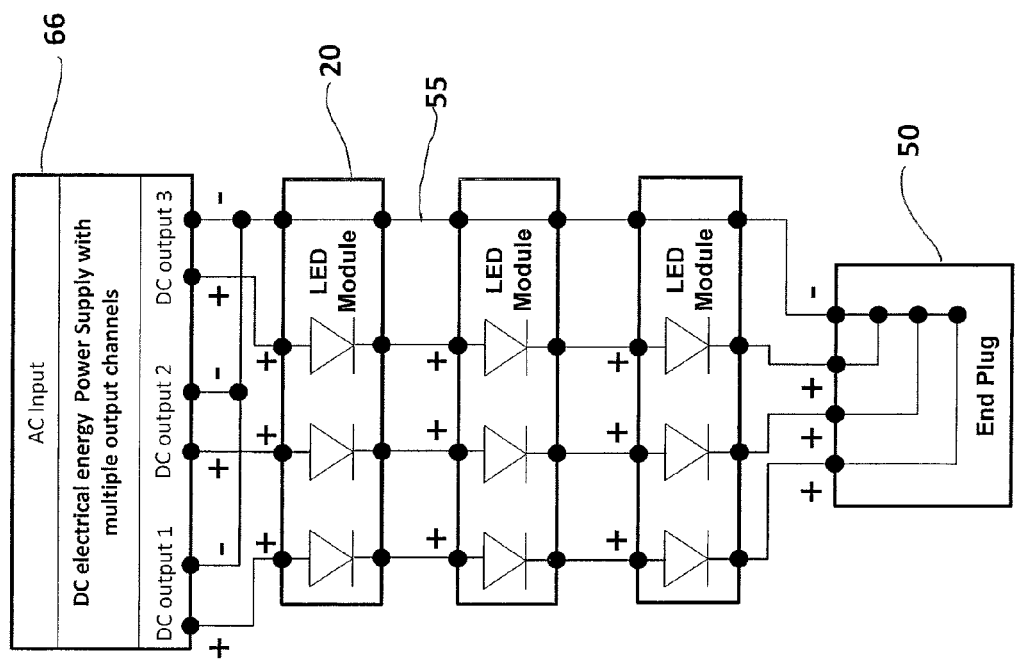
Figure 9:
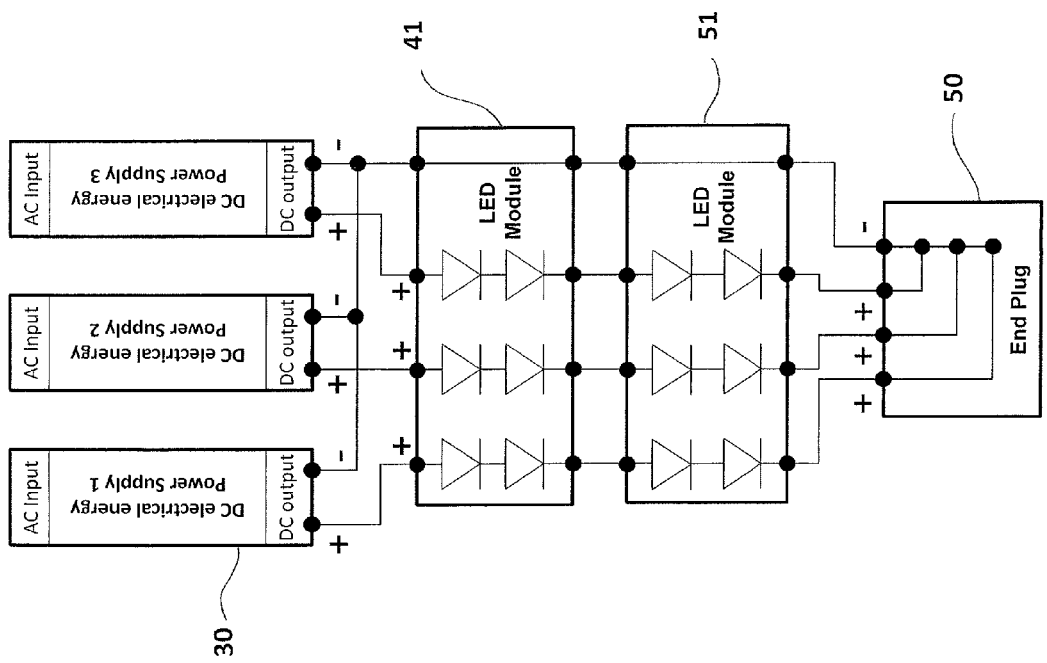
Figure 10:
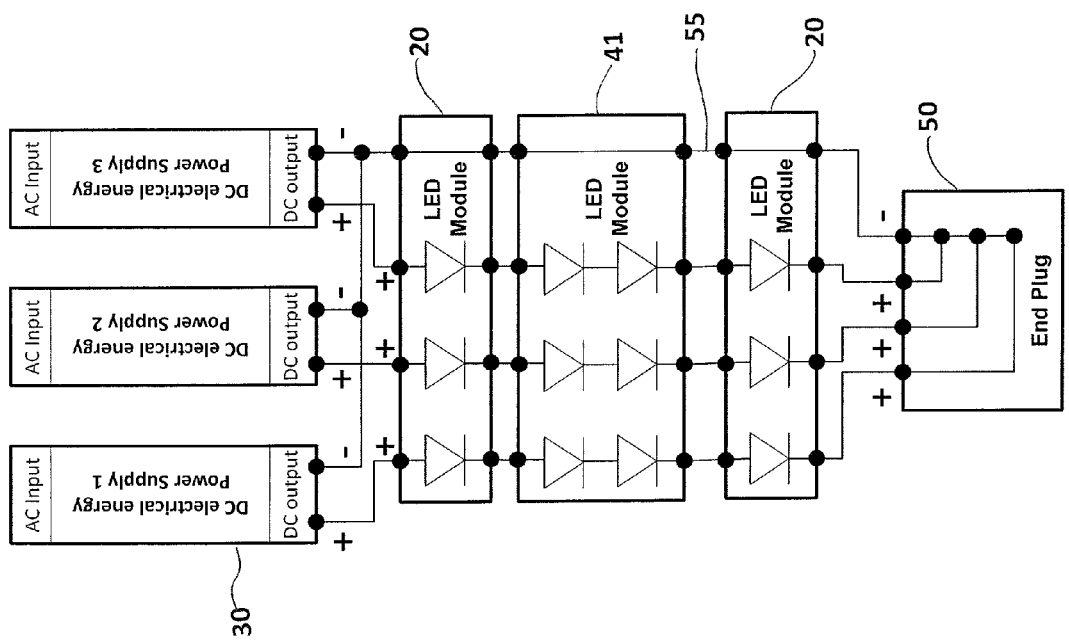
Figure 11:
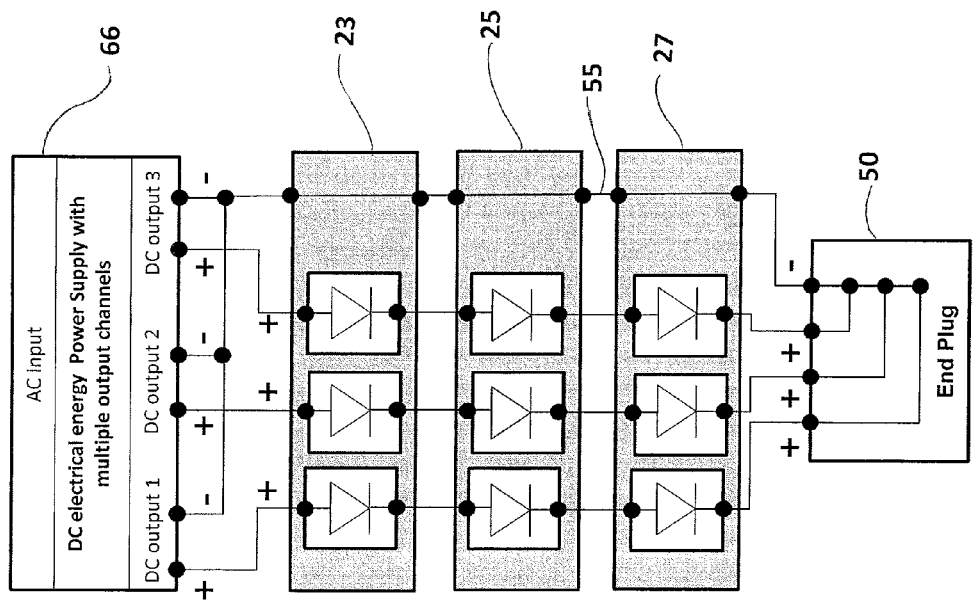
Figure 12:
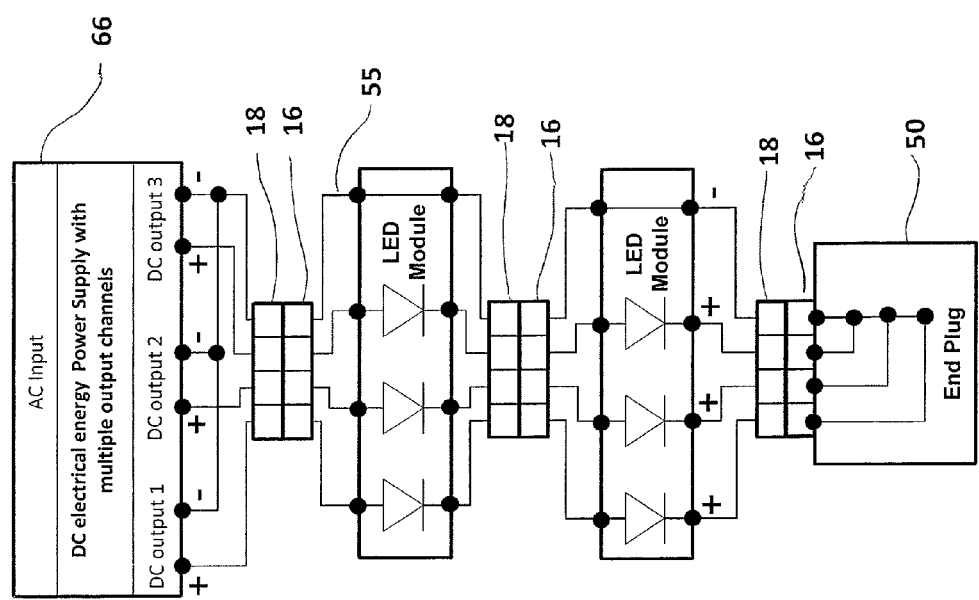
Figure 13A:
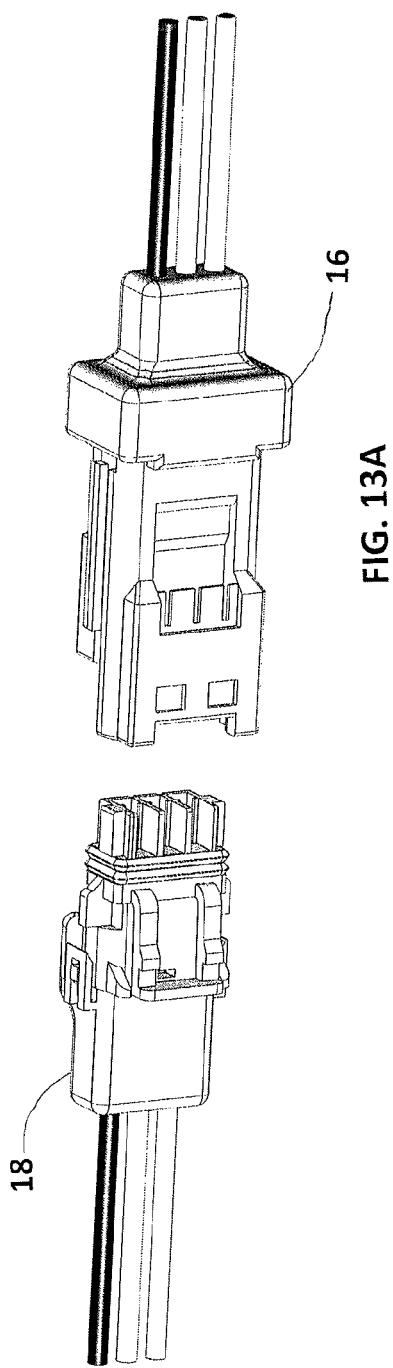
Figure 13B:
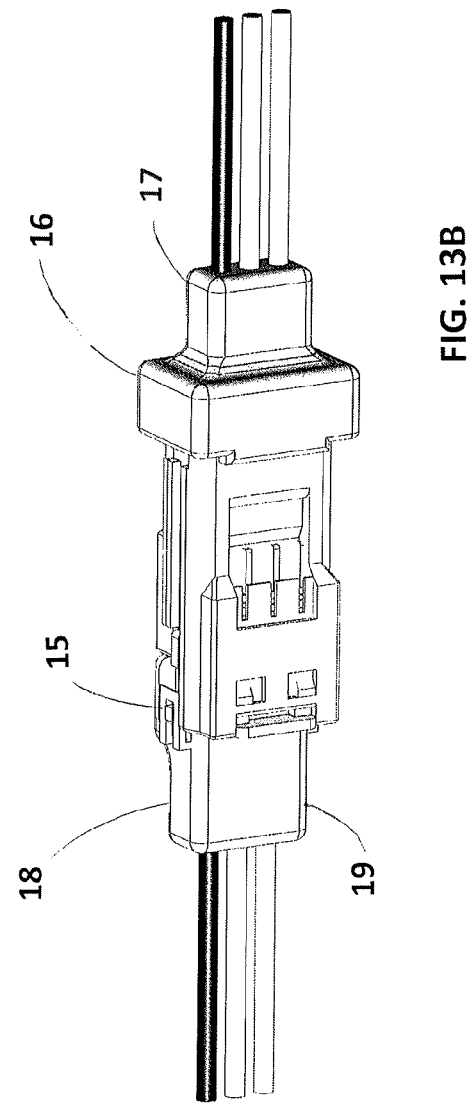
Figure 13D:
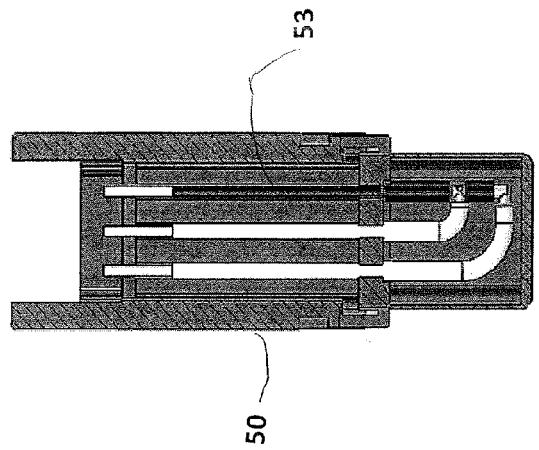
Figure 13C:
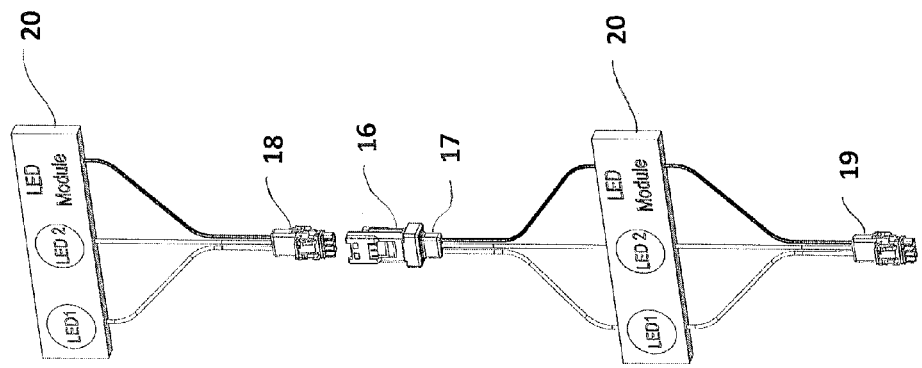

FIG. 5 is a schematic diagram showing a simplified description of the operation of the disclosed system;

FIG. 6A is a schematic diagram of the disclosed power system including three separate alternating current (AC) electrical energy sources in connection with a group of LED modules, each of which has 3 individual LEDs connected to a common negative polarity;

FIG. 6B is a schematic diagram similar to FIG. 6A but showing the use of two separate alternating current (AC) electrical energy sources;

FIG. 6C is a schematic diagram similar to FIGS. 6A and 6B but showing channels of electrically positive direct current (DC) and electrically negative direct current (DC) electrical energy associated with a common negative polarity and a common positive polarity;

FIG. 7 is a schematic diagram similar to FIG. 6A but showing multiple channels of electrically negative direct current (DC) electrical energy and a common positive polarity;

FIG. 8 is a schematic diagram of a direct current (DC) electrical energy power supply that converts a single alternating current (AC) electrical energy source into three separate direct current (DC) electrical energy output channels;

FIG. 9 is a schematic diagram of a string of LED modules similar to FIG. 6A but wherein each LED module contains three sets of series-connected LEDs;

FIG. 10 is a schematic diagram similar to FIG. 6A but showing the use of two LED modules containing three individual LEDs and one LED module containing three sets of series-connected LEDs;

FIG. 11 is a schematic diagram similar to FIG. 6A where each LED module is placed in an LED module carrier and the common connection to the electrical negative polarity passes through the LED module carrier;

FIG. 12 is a schematic diagram similar to FIG. 6A wherein mating electrical connectors are attached to the input and output wires of the LED modules, DC electrical energy power supply and the end plug;

FIG. 13A and FIG. 13B are perspective views illustrating an unconnected and connected types of electrical connectors that are shown schematically in FIG. 12;

FIG. 13C is a perspective view of an end plug shown at the end of a string of LED modules according to the present invention;

FIG. 13D is a cross-sectional view of an end plug; and

Figure 14:
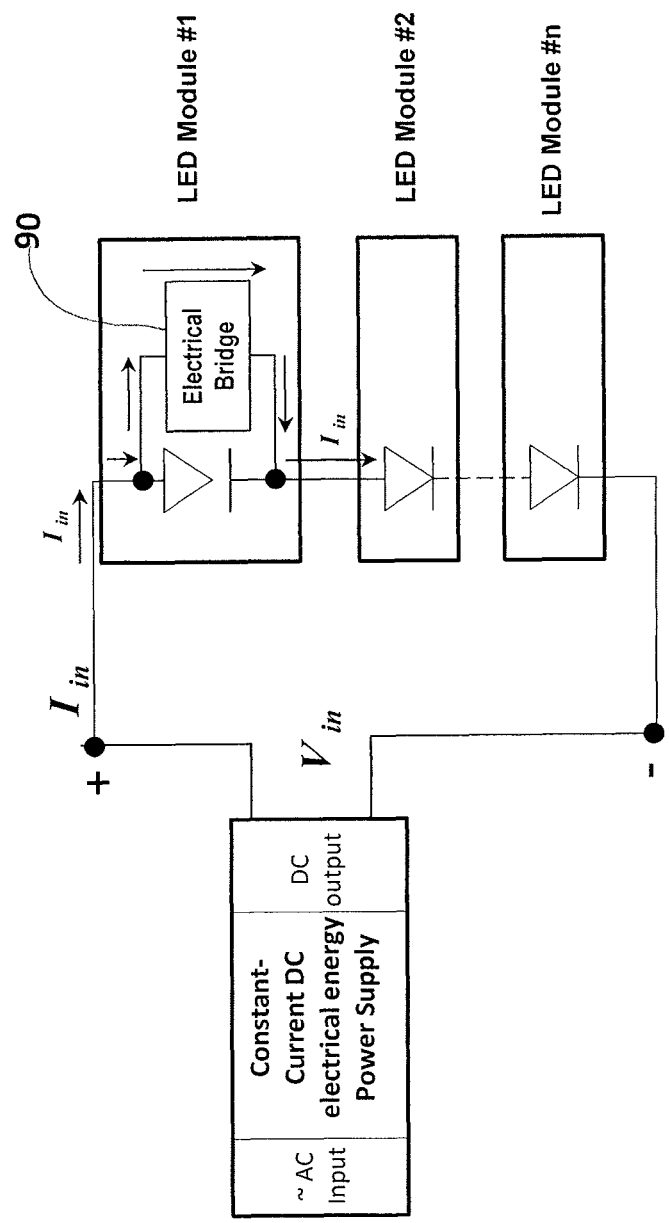

FIG. 14 is a schematic diagram describing an electrical bridge circuit which actuates when one of the individual LEDs is no longer able to pass DC electrical energy.

DESCRIPTION OF THE EMBODIMENTS

A better understanding of the disclosed system may be had from an understanding of a light emitting diode (LED) and how an LED receives electrical energy. Following this description of an individual LED and how the individual LED receives electrical energy will be a description of the disclosed system, its operation and its embodiments.

LEDs are current driven electrical devices. This means that the light output from an individual LED and the forward voltage across the individual LED are determined by the electrical current applied to the individual LED. Both alternating current (AC) electrical energy and direct current (DC) electrical energy can be used to cause individual LEDs to emit light. However, when an AC electrical energy source is used, which AC electrical energy source typically has a frequency of 50 Hz to 120 Hz, the light emitted from an individual LED will be perceived by the human as flickering. To eliminate such undesirable flickering, a direct current (DC) supply of electrical energy can be applied to the individual LED. Specifically, a constant amount of DC electrical energy applied to an individual LED causes the individual LED to emit a stable, non-flickering output of visible light. Specifically, a constant amount of DC electrical current applied to an LED causes the LED to emit a stable, non-flickering output of visible light.

Because individual LEDs emit a stable, non-flickering output of visible light when a direct current (DC) is applied to the individual LED, it becomes necessary to transform commonly available sources of AC electrical energy into DC supplies of electrical energy. Typically, such transformation of AC electrical energy into DC electrical energy is accomplished by the use of DC electrical energy power supply. This DC electrical energy power supply takes the alternating current (AC) electrical energy from the AC electrical line as input, conventionally 110 volt AC/60 Hz, or 220 volt AC/50 Hz, converts the input of alternating current (AC) into direct current (DC) electrical energy as an output.

Figure 1A:
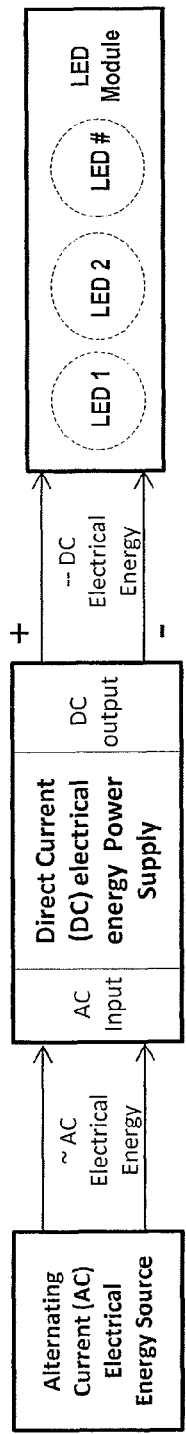
FIG. 1A is a schematic diagram of a prior art system for providing alternating current (AC) electrical energy to an LED module.
Figure 1B:
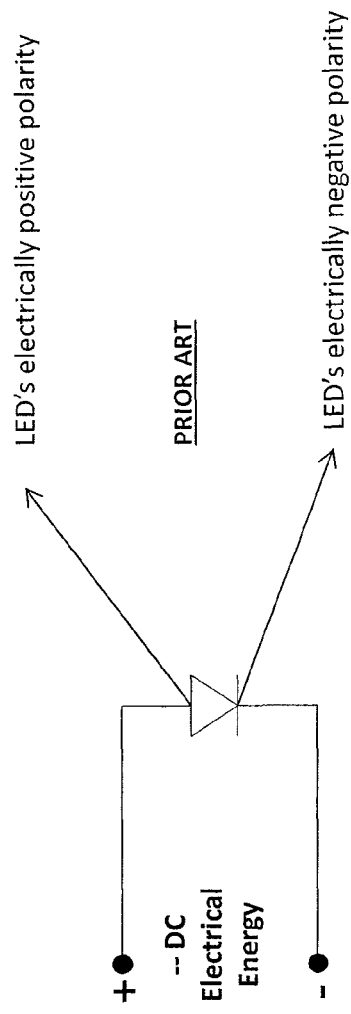
FIG. 1B is a schematic diagram of a prior art LED showing both the electrically positive side and the electrically negative side of an LED.

The foregoing operation of an individual LED and the flow of direct current (DC) to the individual LED is best illustrated in FIG. 1A. Therein, an AC electrical energy source is shown as the input to a DC power supply. The output of the direct current (DC) power supply is a single DC electrical energy channel which provides DC electrical energy to the individual LEDs in an LED module. Shown in FIG. 1B is that the individual LEDs in the LED module, which are connected to the output of a DC electrical energy power supply, have an electrically positive side and an electrically negative side.

Conventionally, there are two types of output electrical energy from a DC electrical energy power supply, a constant voltage DC output, such as 12 volts DC, 24 volts DC etc., or a constant current DC output, such as 0.5 amperes DC, 1 ampere DC, etc.

For a DC electrical energy power supply with a constant voltage DC output, its rated output wattage determines the maximum output of DC current at the rated output of constant voltage DC. For example, a constant-voltage DC electrical energy power supply rated at 96 watts and 24 volts DC, provides an output electrical energy as a constant DC voltage of 24 volts, and a DC electrical current of 0 to 4 amperes (96 watts/24 volts=4 amperes). The electrical load applied to the output (0-96 watts) of the constant voltage (DC) power supply determines the actual output of DC amperage from this constant voltage DC electrical energy power supply.

When the DC electrical energy power supply provides a constant voltage DC output, each LED module in the string receives the same DC voltage as input electrical energy to power the LEDs and thereby consumes a certain amount of DC amperage from the DC electrical energy power supply. The maximum number of LED modules that can be powered by this DC electrical energy power supply is determined by the rated DC amperage of each LED module, and the rated output DC wattage and constant DC voltage of the DC power supply. For example, if an LED module is rated at 24 volts and 0.2 amperes DC, a DC electrical energy power supply rated at 24 volts, 96 watts DC can power a maximum of 20 LED modules (96 watts/24 volts/0.2 amperes=20 LED modules).

For a DC electrical energy power supply with a constant amperage DC output, its rated output wattage determines the maximum output DC voltage at the rated constant amperage DC output. For example, a constant-amperage DC electrical energy power supply rated at 60 watts and 1 ampere DC, provides an output electrical energy as a constant DC amperage of 1 ampere, and a DC electrical voltage of 0 to 60 volts (60 watts/1 amp=60 volts). The electrical load applied to the output (0-60 watts) of the constant amperage direct current power supply determines the actual output of DC voltage from this constant amperage DC electrical energy power supply.

When the DC electrical energy power supply provides a constant amperage DC output, each LED module in the string of LED modules receives the same DC amperage as input electrical energy to illuminate the LEDs and thereby consumes a certain amount of DC voltage from the DC electrical energy power supply. The maximum number of LED modules that can be powered by this DC electrical energy power supply is determined by the rated DC voltage of each LED module, and the power supply's rated output DC wattage and constant DC amperage. For example, if an LED module is rated at 0.5 amperes and 3.0 volts DC, a DC electrical energy power supply rated at 0.5 amperes, 60 watts DC can power a maximum of 40 LED modules (60 watts/3.0 volts/0.5 amperes=40 LED modules).

Figure 2B:
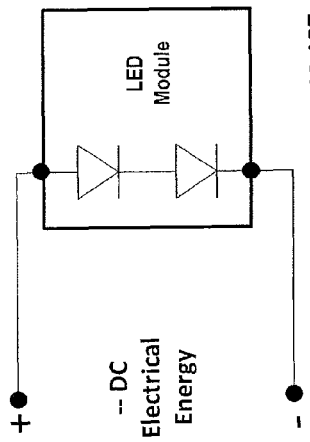
FIG. 2B is a schematic diagram of a prior art LED module having two individual LEDs connected in series.
Figure 2C:
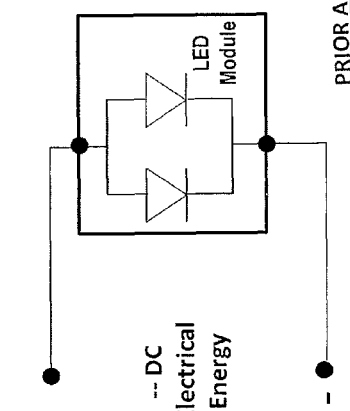
FIG. 2C is a schematic diagram of a prior art LED module having two individual LEDs connected in parallel.
Figure 2A:
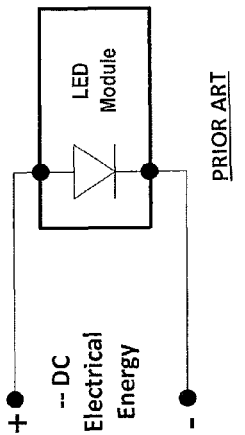
FIG. 2A is a schematic diagram of a prior art LED module having a single individual LED.
Figure 2D:
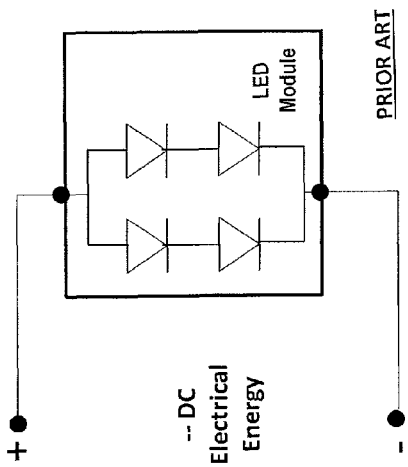
FIG. 2D is a schematic diagram of a prior art LED module having two sets of two individual LEDs connected in series connected in parallel.

For ease of use and incorporation into systems using LEDs to provide light energy, individual LEDs are typically incorporated into various types of LED modules. Such LED modules contain either a single individual LED as shown in FIG. 2A, multiple individual LEDs in a series connection as shown in FIG. 2B, multiple individual LEDs in parallel connections as shown in FIG. 2C, or sets of series-connected individual LEDs in parallel connection as shown in FIG. 2D. For the purpose of this description, the use of multiple LEDs in series-connection, individual LEDs in parallel connection and multiple LEDs in parallel connection shall be considered equivalent to individual LEDs.

Figure 3:
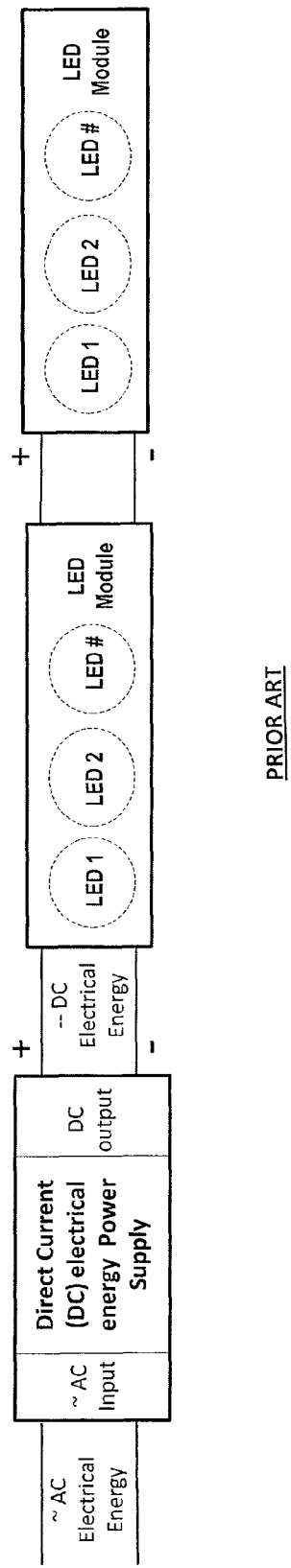
FIG. 3 is a schematic of a prior art string of LED modules powered by a source of alternating current (AC) electrical energy.

In large lighting installations, multiple LED modules containing one or more individual LEDs are connected to one another by wires to form a string of LED modules. The string of LED modules is then connected to the DC output of a DC electrical energy power supply. The wires convey DC electrical energy to each LED module in the string of LED modules shown in FIG. 3.

FIGS. 4A, 4B and 4C are schematic diagrams of prior art systems for using a constant-voltage DC electrical energy power supply to power an LED module where the individual LEDs are connected one to another in series (FIG. 4A), or in parallel (FIG. 4B), or in parallel as two sets of series-connected LEDs (FIG. 4C). The flow of DC electrical energy from the DC electrical energy power supply is provided to each individual LED after which the electrical circuit for each LED module is completed. Because this power supply provides a constant-voltage DC output to the LED module, an integrated circuit component 114, typically a chip mounted on a printed circuit board inside each LED module, transforms the DC constant voltage into a flow of DC constant amperage to the LEDs in the LED module.

The efficiency of electrical energy utilization in the prior art systems illustrated in FIGS. 4A, 4B and 4C for generating light is about 75%. The loss of efficiency in the utilization of electrical energy is due to the creation of heat (25%) while the integrated circuit component consumes the gap between the DC voltage across the LEDs and the DC constant voltage from the power supply. The heat generated by the integrated circuit is dissipated within the LED module. For example, a 24-volt constant-voltage DC system, Vin as shown in FIG. 4A, can provide enough electrical energy to illuminate six LEDs which has a total forward voltage of about 18 volts. Accordingly, the integrated circuit component consumes about 6 volts by dissipating it into heat. A 12-volt constant-voltage DC system can provide enough electrical energy to illuminate three LEDs which have a total forward voltage of about 9 volts. Accordingly, the use of an integrated circuit component results in the consumption of about 3 volts by dissipating the electrical energy into heat. It is this creation of heat which reduces the efficiency of prior art power systems used with LEDs.

If a switch-mode driver circuit is used in each LED module, which switch mode driver circuit can increase the amount of input DC voltage and provides a DC constant amperage to the LEDs, the efficiency of the prior art LED system initializing a switch mode driver circuit may be greater than 75%. However, such switch-mode driver circuits are not frequently used because of their higher cost as multiple electrical components are needed to achieve a proper operation of the switch-mode driver circuit.

In addition, when prior art systems are used in long strings which include many LED modules containing multiple individual LEDs, the available DC current (in amperes) from the DC electrical energy power supply to power an individual LED in an LED module is limited by its wattage rating according to electrical safety regulation. In turn this limitation on wattage reduces the light output per individual LED. Accordingly, to increase the total light output of the lighting system, there is a need to either use more LED modules having the same number of individual LEDs, or to incorporate more LEDs into each LED module. As indicated above, the use of more individual LEDs or more LED modules with the same number of individual LEDs raises both the cost of the lighting system and the amount of electrical energy consumed.

As discussed above, each DC electrical energy power supply can provide either a constant-voltage, or a constant-amperage DC electrical energy output. When the DC electrical energy power supply provides a constant amperage DC electrical energy output to a series connection of individual LEDs in the string of LED modules having multiple LEDs as shown in FIG. 5, this DC constant amperage $I_{in}$ from the power supply is equal to the needed DC electrical current through the individual LEDs within the LED module. The amount of DC voltage required Vin is the sum of the voltage requirements ($V_1, V_2, \ldots V_n$) for each individual LED in the series of LEDs.

As shown in FIG. 6A and according to the disclosed system 10, each LED module 20 in the disclosed power system contains multiple individual LEDs 22. The individual LEDs within an LED module are powered separately by multiple DC electrical energy power supplies 30. The LED modules are connected together into a string of LED modules 40. Each LED module in the string contains the same number of individual LEDs. Each DC electrical energy power supply is connected to one of the individual LEDs in each module, thereby forming a series connection among each of the individual LEDs including all of the LED modules in the string of LED modules.

Further, as shown in FIG. 6A, multiple DC electrical energy power supplies, wherein the number of DC electrical energy power supplies is the same as the number of individual LEDs in each module, form separate series connections for all of the individual LEDs in the string of LED modules. At the end of the string of LED modules in an end plug 50. The end plug 50 receives the positive polarity DC electrical energy output from each LED in the last LED module in the string of LED modules. The end plug brings together the outputs from the last LED module in the string of LED modules, and as shown in FIG. 6A, completes the electrical circuit through a single connection or wire 55 to a common negative at the DC electrical energy power supplies.

Shown in FIG. 6B is the use of three DC electrical energy power supplies. One source of AC electrical energy 60 provides two DC electrical energy output channels 32 and 34. The other source of AC electrical energy 62 provides a single DC electrical energy output channel 36.

Shown in FIG. 6C is a system similar to that shown in FIG. 6B but including a third source of AC electrical energy 64 producing a fourth output of DC electrical energy 38. Note that the of DC electrical energy channels 36 and 38 on the rightmost portion of the schematic begin with a negative polarity while the other two DC electrical energy channels 32 and 34 on the leftmost portion of the schematic begin with a positive polarity. In such case, the DC electrical energy channels with a positive polarity of DC electrical energy 32, 34 return through the end plug 52 to a common negative polarity to close the electrical circuit. At the same time, the DC electrical energy channel 36 and 38 with a negative polarity returns to a common positive polarity through the end plug 52 to close the electrical circuit. Such use of multiple polarities in a string of LED modules will provide additional design options to users of strings of LED modules; for example, the design of lighting for signs, the design of modular lighting systems and the design of linear distributive lighting systems such as used in display cases and display shelves found in retail stores.

In the illustrated embodiments of the disclosed system, each DC electrical energy power supply includes and electrically positive polarity and an electrically negative polarity. The electrically positive polarity is connected to the positive side of DC electrical energy input of one of the individual LEDs in the first module in the string of LED modules. The DC electrical energy output from this individual LED in the first module in the string of LED modules is then connected to the electrically positive side of DC electrical energy input of one of the individual LEDs in the second LED module in the string of LED module. The same type of connection from the second LED module in the string of LED modules is repeatedly formed to reach one of the individual LEDs in the last module in the string of LED modules. The DC electrical energy output from this individual LED in this last module is then connected to the negative polarity of the same DC electrical energy power supply to form a completed electrical circuit.

A second DC electrical energy power supply forms the same type of series connections as described in the preceding paragraph with a second LED in each one of the LED modules in the same string of LED modules. The same type of series connection is formed between all individual LEDs in an LED module and all separate DC electrical energy power supplies.

As shown in FIG. 6A and FIG. 6B, for the multiple DC electrical energy power supplies, either an electrically positive polarity or an electrically negative polarity may be established as the common polarity to complete the electrical circuit. As explained in FIG. 6A and in FIG. 6B, where the DC electrical energy polarity starts off positive, the common polarity at the end of the string of LED modules is an electrically negative polarity to complete the DC circuit. The electrically negative polarity of the multiple DC electrical energy power supplies is electrically connected together at the end plug 50 to come together as a single connection or wire 55 to the common negative polarity. Thus, the output of each of the individual LEDs in the last module in the string of LED modules is connected to the common negative polarity of the multiple DC electrical power supplies.

As described above, the electrical connection on the output side of the last LED module in the string of LED modules is called an end plug 50 as shown in FIG. 6A and in FIG. 6B. The end plug 50 will take the above single output of the common negative polarity of the multiple DC electrical energy power supplies, along with the multiple outputs from the individual LEDs in the last LED module. The end plug 50 will then connect each of these individual LED's outputs to the common negative polarity of the multiple DC electrical energy power supplies. Accordingly, the electrical circuit at each DC electrical energy power supply is completed.

As shown in FIG. 6A and in FIG. 6B one wire 55 is used to connect from the positive polarity of the individual DC electrical energy power supply to the individual LED in each one of the LED modules in the string, therefore, the number of wires connecting to the positive polarity is the same as the number of individual LEDs per LED module, as well as the number of DC electrical energy power supplies. One wire 55 is used as the single connection to the common negative polarity of the multiple DC electrical energy power supplies. This one wire may run back to the DC electrical energy power supplies through all LED modules without any electrical connections to the individual LEDs or any other electrical components in the LED module, as a single wire simply passing through the LED module. Alternatively, the single wire may be electrically connected, such as by soldering, etc., to an isolated copper trace on the printed circuit board inside the LED module.

Shown in FIG. 6A and in FIG. 6B are circuits where all of the individual LEDs receive a common positive polarity of DC electrical energy and where a single wire or path 55 for electrical current is shown on the right side of each schematic runs from the end plug 50 at the bottom of the string of LEDs to the common negative polarity of the DC electrical energy power supply(s). The use of a single wire or current path 55 minimizes the complexity of the power system of the disclosed system. Those of ordinary skill in the art will understand that the single wire 55 may run freely alongside each LED module in the string of LED modules or pass back through an opening in each LED module on its way back to the common negative polarity at the DC electrical energy power supply. As indicated above, a copper trace on a printed circuit board may be used individually or in combination with a single wire to form the path for the positive polarity DC electrical energy back to the common negative polarity.

According to the preferred embodiment of the disclosed system, each LED with an LED module is provided with positive polarity DC electrical energy from one of the multiple DC electrical energy power supplies, or one of the individual DC output channels from a single DC electrical energy power supply. Once the positive polarity DC electrical energy flows into an individual LED, which causes a portion of the DC electrical energy to be used to emit light energy from the individual LED, the remaining DC electrical energy flows onto another individual LED in another LED module. At the end of the string of LED modules, the electrical circuit is completed by directing the positive polarity DC electrical energy to a common negative polarity of the DC electrical energy power supply(s).

Those of ordinary skill in the art will also understand that instead of using positive polarity DC electrical energy, the disclosed system will still operate if multiple channels of negative polarity DC electrical energy are used and a common positive polarity were used to complete the electrical circuit as shown in FIG. 7.

FIG. 8 illustrates a single AC electrical energy source 66 having three separate DC electrical energy power supply output channels.

Because the needed DC constant amperage supply of electrical energy comes the DC power supply, there is no need to include an integrated circuit component on a printed circuit board with the LED module as shown in FIG. 4A, 4B and 4C. Thus, all of the DC electrical energy supplied to the LED module is used to illuminate the individual LEDs within the LED module. Accordingly, each LED module has a higher electrical system efficiency than prior art LED modules as there is no integrated circuit component which transforms electrical energy into heat energy. Such increase in electrical system efficiency allows a greater light output from each individual LED, and minimizes the heat dissipation from the LED module.

As discussed above, when a string of LED modules is powered by a constant-voltage DC electrical energy power supply, as opposed to a constant amperage DC electrical energy power supply, the output DC amperage from the constant voltage DC electrical energy power supply is the sum of the DC amperages consumed by all of the LED modules in the string of LED modules. Therefore, the DC amperage for each LED module is the maximum DC output amperage from the constant-voltage DC electrical energy power supply divided by the number of modules in the string. This limits the amount of DC electrical amperage available for each LED module, hence the light output that can be generated by each LED module is limited. When a constant-amperage DC electrical power supply is used in the disclosed system, the DC amperage for each LED in an LED module is equal to the rated DC output amperage from that constant-amperage DC electrical energy power supply, or from one of the output channels if a single power supply with multiple DC output channels is used. Therefore, the available DC amperage for each LED from a constant-amperage DC electrical power system is multiple times higher than the available DC amperage for each LED from a constant-voltage DC electrical power system.

Since the light output of an individual LED is determined by the DC electrical amperage powering the LED, a constant-amperage DC electrical energy power supply in the disclosed system provides much higher available DC electrical amperage for each individual LED in any of the LED modules in the string, hence there is a much higher light output per individual LED. With this greater light output from each individual LED, the number of individual LEDs needed in each LED module can be reduced while the same level of light energy from the LED module is maintained.

The number of LED modules in the string of LED modules depends on the amount of energy provided by the positive polarity DC electrical energy supply and the amount of electrical energy needed for each individual LED to emit the desired level of light energy.

Shown in FIG. 9 is a string of LED modules 41, 51 similar to that shown in FIG. 6A. However, instead of each LED module having a single LED powered by a DC electrical energy channel, each LED module contains sets of series-connected individual LEDs within the LED module.

Shown in FIG. 10 is a string of LED modules which is a combination of the embodiments shown in both FIG. 6A and in FIG. 9. That is, two of the LED modules contain a single individual LED powered by the DC electrical energy channel and one of the LED modules 41 contains a set of series-connected individual LEDs within the LED module.

Shown in FIG. 11 is a system similar to that shown in FIG. 8; however, each LED module in a string of LED modules is placed within a module carrier 23, 25, 27. Herein the module carrier may provide a hole or a channel in which the single wire 55 or current path may be enclosed or positioned on its way to the common negative polarity. The disclosed module carriers may also include lenses to manage or direct the output of light energy from the LEDs or a clear cover to protect the LEDs.

Shown in FIG. 12 is another system similar to that shown in FIG. 8; however, a set of mating mechanical electrical connectors 16, 18 may be attached to the input and the output wires of an LED module, so that LED modules may be separated one from another. The same type of mating connector may be attached to the wires from the DC electrical energy channel output, and the input of end plug 50, so that the DC electrical energy power supply and end plug can be separated from the string of LED modules.

FIGS. 13A and 13B illustrate the type of mechanical electrical connectors, shown schematically in FIG. 12, which may be used among LED modules, the DC electrical energy power supply and the end plug. Specifically, a first male side 18 of a separable mechanical connector is connected to the output of an LED module. Since there are three DC electrical energy channels passing through the LED module, the connector receives DC electrical power from these three separate energy channels through three separate leads to the female side 16 of the separable mechanical connector. As shown in FIG. 13C, three separate leads may pass through a strain relief portion 17 of the female side 16 of the separable mechanical connector. A latch mechanism 15 including protrusions is located on the side of the male side of the connector.

Those of ordinary skill in the art will understand that a variety of different connectors may be used in addition to the ones illustrated in FIG. 13A, in FIG. 13B, and in FIG. 13C. At the bottom of the male side 18 of the separable mechanical connector is another strain relief 19 which surrounds the three separable leads exiting from the male side of the separable mechanical connector. It has also been found that if both the female side of the separable mechanical connector and the male side of the separable mechanical connector include an arrow formed or printed thereon, which arrows follow the path of the flow of direct current electrical energy, the assembly of the LED module into a string of LED modules is made easier for the one who puts together the string of LED modules.

As shown in FIG. 13C, the three DC electrical energy channels terminate at the male portion of the last LED module. After the male portion of the last LED module is connected to the female portion of the end plug 50, the three DC electrical energy channels are electrically conducted to a common negative polarity thereby assuring that circuit of each DC electrical energy channel through the LED modules is completed.

The cross-section of the end plug 50 shown in FIG. 13D shows the plug where two outputs from the LEDs in the last LED module are combined into a common conductor 53 which connects the single wire or current path 55 to complete the circuit with the direct current electrical energy power supply.

Those of ordinary skill in the art will understand that when LEDs are connected into a DC series electrical circuit, one of the LEDs with an open-circuit failure will open the DC series electrical circuit so that no DC electrical energy will pass through the electrical circuit. In this case, an electrical bridge circuit 90 as shown in FIG. 14 is connected in parallel with the LED. The electrical bridge circuit activates when one of the individual LEDs is no longer able to pass DC electrical energy. Thereby, the DC electrical energy can pass through the electrical bridge circuit instead and flow to the remaining operational LEDs to continue emitting light energy. Such electrical bridge circuit 90 typically includes a Zener diode.

Those of ordinary skill in the art will understand that the disclosed invention may include other changes and modifications known to those of ordinary skill in the art. Such changes and modifications shall be included within the scope and meaning of the appended claims.

What is claimed is:
1. A power system for a plurality of LED modules wherein each LED module includes the same number of individual LEDs, each LED having a positive side and a negative side, said power system comprising:
    a plurality of electrical energy power supplies, each electrical energy power supply having a single alternating current (AC) electrical energy input and a single direct current (DC) positive polarity electrical energy output channel, wherein the number of electrical energy power supplies is equal to the number of individual LEDs in each LED module;

wherein each of the individual LEDs in said plurality of LED modules being directly electrically connected in series to an individual LED contained in the next LED module, thereby forming a number of individual LED series connections across all LED modules that is equal to the number of individual LEDs contained in each LED module;

wherein each of said single direct current (DC) positive polarity electrical energy output channels from said plurality of electrical energy power supplies is directly connected to one of said individual LED series connections across all LED modules such that the single direct current (DC) positive polarity flow of direct current (DC) electrical energy to the positive side of the first individual LED in the individual LED series connection and a negative polarity flow of direct current (DC) electrical energy from the negative side of the last individual LED in the same individual LED series connection completes the electrical circuit.

2. The power system as defined in claim 1 wherein each of said power supplies in said plurality of power supplies is a constant-voltage power supply.

3. The power system as defined in claim 1 wherein each of said power supplies in said plurality is a constant-amperage power supply.

4. The power system as defined in claim 1 wherein the LED modules include wires for input and output electrical connections within each individual series connection and a common wire to the negative polarity of a power supply.

5. The power system as defined in claim 4 wherein said common wire is electrically connected to an isolated conductive trace on each printed circuit board in one or more LED modules.

6. The power system as defined in claim 4 wherein said common wire is conducted through an opening in one or more LED modules.

7. The power system as defined in claim 4 wherein each LED module is mounted in a carrier.

8. The power system as defined in claim 7 wherein said common wire is conducted through an opening in said carrier.

9. The power system as defined in claim 1 further including an end plug connecting the electrical output of each of said individual LED series connections from the last LED module in a plurality of LED modules, to the output at a negative electrical polarity from each of said DC positive polarity electrical energy channels that powers the same individual LED series connection to complete the electrical circuits for all DC electrical energy channels, said end plug being located on the output side of the last LED module being the farthest electrically connected to said DC electrical energy channels.

10. A power system for a plurality of LED modules wherein each LED module includes the same number of individual LEDs, each LED having a positive side and a negative side, said power system comprising:

a plurality of electrical energy power supplies, each electrical energy power supply having an alternating current (AC) electrical energy input and a single direct current (DC) negative polarity electrical energy output channel, wherein the number of electrical energy power supplies is equal to the number of individual LEDs in each LED module;

wherein each of the individual LEDS in said plurality of LED modules being directly electrically connected in series to an individual LED contained in the next LED module, thereby forming a number of individual LED series connections across all LED modules that is equal to the number of individual LEDs contained in each LED module;

wherein each of said single direct current (DC) negative polarity electrical energy output channels from said polarity of electrical energy power supplies is directly connected to one of said individual series connections across all LED modules such that the single direct current (DC) negative polarity flow of direct current (DC) electrical energy to the negative polarity of the first individual LED in the individual series connection and a positive polarity flow of direct current (DC) electrical energy from the positive side of the last individual LED terminal in the same individual LED series connection completes the electrical circuit.

11. The power system as defined in claim 10 wherein each of power supplies in said plurality of power supplies is a constant-voltage power supply.

12. The power system as defined in claim 10 wherein each of said power supplies is a constant-amperage power supply.

13. The power system as defined in claim 10 wherein each power supply in said plurality of power supplies has a single input from and alternating current (AC) electrical power source, and provides a single output channel of negative polarity electrical energy.

14. The power system as defined in claim 10 wherein the LED modules include wires for input and output electrical connections within each individual series connection and a common wire with positive polarity of a power supply.

15. The power system as defined in claim 14 wherein said common wire is electrically connected to an isolated conductive trace on each printed circuit board in one or more LED modules.

16. The power system as defined in claim 14 wherein said common wire is conducted through and opening in one or more modules.

17. The power system as defined in claim 14 wherein each LED module is mounted in a carrier.

18. The power system as defined in claim 17 wherein said common wire is conducted through an opening in said carrier.

19. The power system as defined in claim 18 further including an end plug connecting the electrical output of each said individual series connections from the last LED module in a plurality of LED modules to the output at a positive electrical polarity from each of said negative electrical energy channels that power the same individual LED series connection to close the electrical circuits for all direct current (DC), said end plug being located on the output side of the last LED module being the farther electrically connected to said direct current electrical energy channels.

* * * * *